Dec. 2, 1952    H. N. LUBY    2,620,215
MOTOR VEHICLE GUARD
Filed Sept. 9, 1946    2 SHEETS—SHEET 2
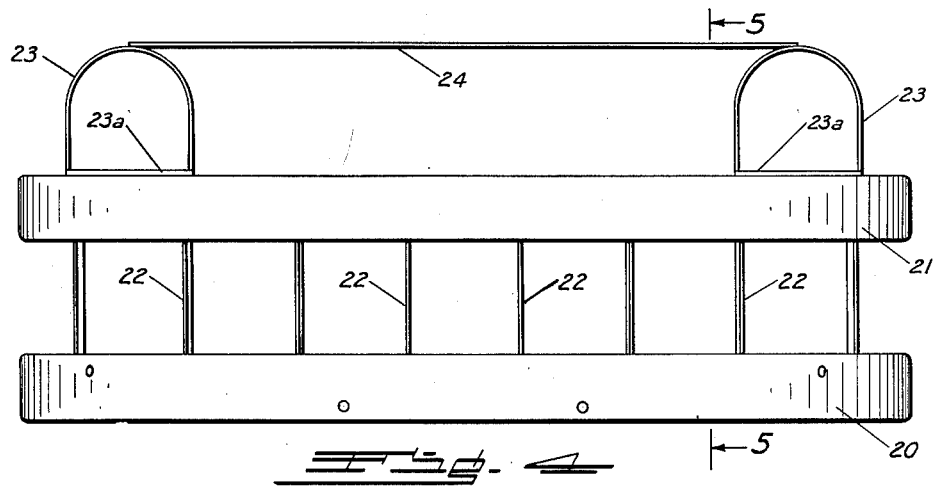
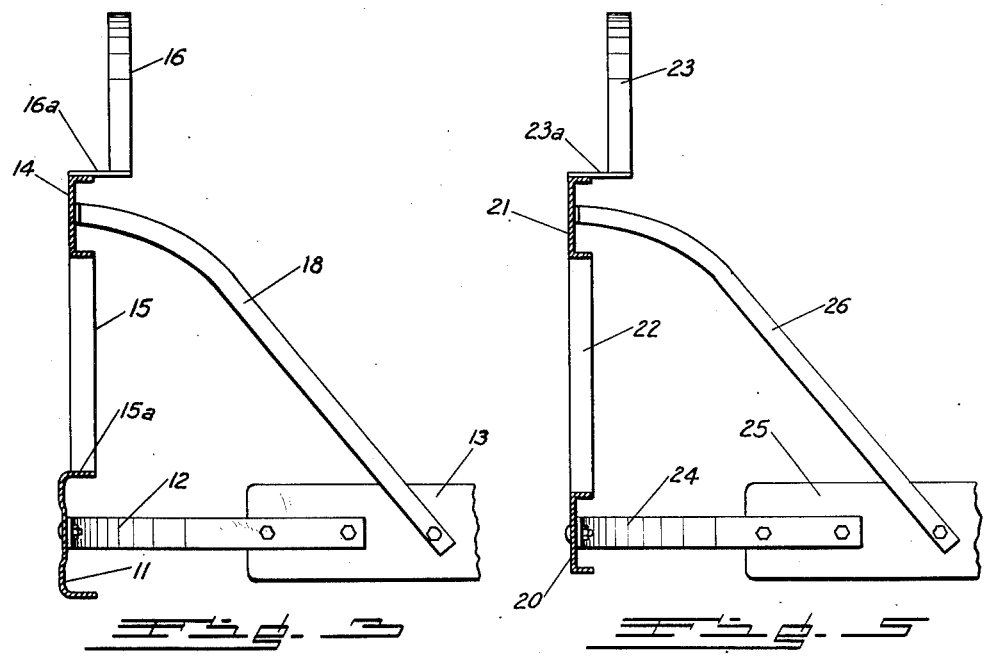
Henry N. Luby
INVENTOR.
BY
ATTORNEY Patented Dec. 2, 1952

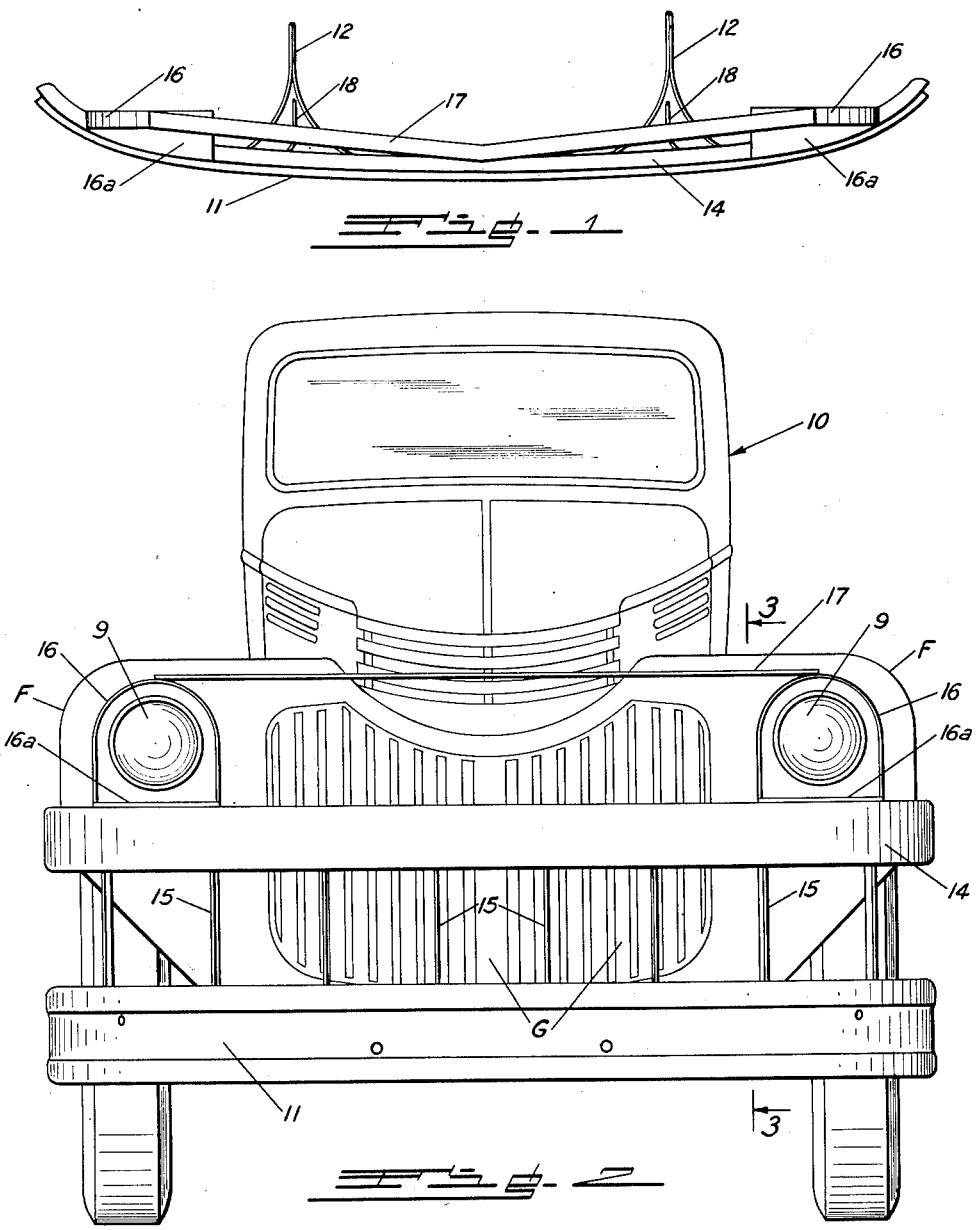

2,620,215

UNITED STATES PATENT OFFICE 2,620,215

MOTOR VEHICLE GUARD

Henry N. Luby, Denver, Colo.

Application September 9, 1946, Serial No. 695,738

1 Claim. (Cl. 293—64)

The present invention relates to motor vehicle guards for use on trucks and the like. It has to do with a guard structure, or unit, capable of protecting the radiator grille, head lamps and front fenders of the vehicle to which it is attached.

Various types of guards for vehicles are represented in the prior art but none of these guards has the feature or advantage of affording protection against damage for all of the component parts of the forward end of a motor vehicle body. Some of them provide protection for the head lamps and the radiator and its ornamental grille; others have parallel horizontal bars intended to protect the front fenders of the vehicle body; but non of them is believed to be adapted for or capable of protecting the radiator and grille, the head lamps and the front fenders, all by means of a rigid unitary assembly.

Generally speaking, the present invention relates to an improved unitary guard assembly or structure which is preferably formed from steel, or other metal, and which, in one of its forms, is adapted to be rigidly connected to the standard front bumper of a truck to provide with said bumper, a rigid unit of sufficient size to protect the entire front end of the truck or vehicle body. In another of its forms, the guard assembly or unit includes upper and lower parallel bumper members, the lower member serving the purpose of the usual front bumper and the said unit having means extending rearwardly from the lower bumper member for attachment to a vehicle frame and additional brace means or connections extending rearwardly from the upper bumper member to be affixed to the vehicle frame in the vicinity of the lower bumper member attach-means, to thus support the entire guard structure or unit from the forward portions of the vehicle frame.

One of the objects of the present invention is to provide a structure of the foregoing character which is of relatively simple construction, inexpensive to manufacture, and capable of being attached quickly and easily to the front end of a motor vehicle, such as a truck, to afford complete protection for the entire front end of the body thereof against damage resulting from contact with stationary or mobile objects.

Another object of the present invention is to provide a structure which in one of its forms, is capable of being rigidly applied to the standard or conventional front bumper of a truck and to be easily connected to the truck frame to be supported by the frame and the bumper and to provide with said bumper, a protecting shield or guard.

A further object of the invention is to provide a guard assembly in the form of a single unitary and rigidly formed structure which includes upper and lower bumper bars extending outwardly sufficiently to protect the front fenders as well as the radiator grille, and having integral guard members which serve to frame and thus protect the head lamps as well.

The foregoing and other objects and advantages of the invention will be apparent from the following description and appended claim when considered in connection with the accompanying drawings forming a part of this specification wherein like reference characters designate corresponding parts in the several views.

In said drawings:

Fig. 1 is a top plan view of a guard assembly or unit in accordance with one embodiment of the present invention.

Fig. 2 is a front elevational view of a truck showing the application of the guard unit of Fig. 1 to the front end thereof.

Fig. 3 is a fragmentary vertical sectional view taken substantially along the line 3—3 of Fig. 2, looking in the direction of the arrows.

Fig. 4 is a front elevational view of a somewhat modified form of guard unit or protector embodying the present invention; and Fig. 5 is a vertical section taken substantially along the line 5—5 of Fig. 4, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figs. 1, 2 and 3 of the drawings the particular form shown in these figures was evolved particularly for application and connection to the standard or conventional front bumper of a motor vehicle, such as a truck, to provide with said bumper, a unit capable of protecting the forward end of the body including the radiator, grille G, head lamps 9 and front fenders F.

In Fig. 2 a conventional truck is shown at 10 and is provided with a standard front bumper 11, shown as being of channel shape in cross section and connected by pairs of converging arms or brackets 12 at spaced points to the forward portions of the truck frame members 13, one such being shown in Fig. 3. In accordance with this form of guard unit or assembly there is provided an upper bumper member or bar 14 carrying a series or plurality of rigid bars or brace members 15 and a light and fender guard composed of inverted substantially U-shaped shield sections 16, each of which frames and thus protects one of the head lamps 9 and a steel beam, reinforcing bar, or brace 17, which extends between and interconnecting the shield sections 16.

The lower ends of the upright rigid bars or members 15 are preferably welded to the upper flange of the bumper 11, as indicated at 15a in Fig. 3. It will be noted that the rigid bars have a surface in alignment with the rear surfaces of the bumper members 11 and 14. Extending rearwardly and downwardly from the upper bumper member or bar 14 are brace members 18, see Figs. 1 and 3 whose rear ends are attached to the truck frame members 13 at points adjacent the points of attachment of the lower member bar attaching means 12.

As clearly seen in Figs. 1 and 3, the framing shield portions 16 are mounted upon substantially triangular base plates 16a which support the shield sections 16 slightly rearwardly of a vertical plane passing through the bumper 11 and upper bumper bar 14. By the provision of such supporting plates, the beam or reinforcing bar 17 is also located rearwardly of the upright plane through said bumper and bumper bar. The plates 16a may be attached to the upper bumper bar 14 in any suitable manner, as by welding, so as to provide a rigid one-piece guard assembly or unit.

In Figs. 4 and 5 of the drawings a unitary or one-piece guard assembly is shown which is capable of being applied to the front end of a motor vehicle, such as a truck, which has not previously been equipped with a standard front bumper. The present guard includes a lower bumper bar or member 20 which is adapted to supplant the standard front bumper, an upper substantially parallel bumper bar 21, these bars, as shown, being of U-shaped cross section, although it will be understood that they may be formed of any structural steel shape desired. The upper and lower members or bumper bars are connected together by means of a series or plurality of spaced upright rigid bars 22 which extend along the length of the bumper members, as clearly seen in Fig. 4.

The upper bumper bar of member 21 carries a light and fender guard structure which includes shield sections 23 adapted to frame and thus protect the vehicle head lamps (not shown) and a beam or bar 24 which interconnects the upper ends of the shield sections 23. The shield sections 23, as in the preceding form of the invention, are mounted upon substantially triangular plates 23a which may be welded to the upper bumper bar 21, or otherwise permanently attached to said bar. By reason of the provisions of the plates 23a, the light and fender guard portion 23, 24, is offset rearwardly from a vertical plane through the lower and upper bumper bars 20 and 21, respectively.

As seen in Fig. 5, the lower bumper bar 20 of the unit is attached at spaced points by means of pairs of converging brace members of brackets 24, similar to the members 12 of the preceding form, to the forward end portions (one only being shown) of the vehicle frame 25. The upper bumper bar 21 is also connected to and mounted upon the frame members 25 preferably by means of connecting bars or arms 26 similar to the members 18 of the preceding form of the present invention. It will be seen, Fig. 5, that the connecting bars or members 24 and 26 have their rear or inner ends attached to the frame members at adjacent points. Thus, the members 24 and 26 can be said to converge toward the respective forward end portions of the vehicle frame, thus providing greater strength and support to the guard unit.

It is to be understood that the spaced upright members or rigid bars 22 of the guard unit of Figs. 4 and 5 may be connected to the upper and lower bumper bar members in any suitable manner as by having their ends welded to the respective members.

If desired the brace members 12 and 18 of the first form of the invention and 24 and 26 of the other form of the invention may have their inner ends connected together, as by welding, and then be secured by bolts, or the like, to the respective vehicle frame members.

It is to be understood also that, if desired, the spaced upright rigid bars 15 and 22 may be connected to the rear sides or faces of the upper and lower bumper bars of either or both units in any suitable manner, as by welding, and these bars may be flat so as to facilitate their attachment to the bumper bars. Moreover, if desired, the lower ends of the rigid bars may be bolted to the lower bumper bar. That is to say, the same bolts which hold the standard front bumper to its supporting brackets or brace members 12, may be used to connect the lower ends of the rigid bars, or some of them, to the bumper 11 and braces 12.

By virtue of the present invention as represented by the two forms herein disclosed, a complete guard or protector has been provided for the entire forward end of the body of a truck or other motor vehicle, which guard may be applied or attached to the frame of said vehicle quickly and easily. Moreover, it is to be understood that the guard structure of the present invention, being of relatively simple nature, may be manufactured at relatively low cost.

Having thus described the invention what is claimed is:

A vehicle guard assembly unit for the front end of a motor vehicle, comprising upper and lower horizontally disposed members of substantial vertical extent and of a length at least equal to the width of the vehicle on which the guard assembly unit is mounted, a series of vertical members in rigid connection with the respective horizontally disposed members at spaced intervals throughout the length of said horizontal members, a strap-like member in rigid connection with the lower horizontally disposed member adjacent each of its ends and extending rearwardly of the guard assembly unit for a substantial distance and having means for its attachment to the vehicle frame, another strap-like member connected with the upper horizontally disposed member at each of its ends and extending rearwardly and downwardly therefrom and having means at its lower end for holding it in rigid connection with the vehicle frame, the two points of attachment at each side of the vehicle frame being in the horizontal plane of the lower horizontally disposed member and in spaced relation in said plane, and a combined light guard and fender guard mounted upon the upper horizontally disposed member and offset rearwardly of the same.

HENRY N. LUBY.

REFERENCES CITED

The following references are of record in the file of this patent:

UNITED STATES PATENTS

| Number | Name | Date |
|---|---|---|
| D. 148,756 | Bustin | Feb. 24, 1948 |
| D. 148,978 | Bustin | Mar. 16, 1948 |
| 1,443,362 | Heinrich | Jan. 30, 1923 |
| 1,510,986 | Fageol | Oct. 7, 1924 |
| 1,572,942 | McGregor | Feb. 16, 1926 |
| 1,610,516 | Harvey | Dec. 14, 1926 |
| 1,687,337 | Jaeger | Oct. 9, 1928 |
| 1,884,228 | Raskin | Oct. 25, 1932 |
| 2,396,652 | Heilman | Mar. 19, 1946 |